United States Patent
Gehasie et al.

(10) Patent No.: US 7,701,895 B2
(45) Date of Patent: Apr. 20, 2010

(54) METHOD AND SYSTEM FOR ACOUSTIC COMMUNICATION

(75) Inventors: Eyal Gehasie, Rishon Litzion (IL); Tomas Mendelsohn, Kfar Saba (IL)

(73) Assignee: Medit-Medical Interactive Technologies, Ltd., Kfar Saba (IL)

( * ) Notice: Subject to any disclaimer, the term of this patent is extended or adjusted under 35 U.S.C. 154(b) by 1086 days.

(21) Appl. No.: 10/547,701

(22) PCT Filed: Mar. 4, 2004

(86) PCT No.: PCT/IL2004/000214

§ 371 (c)(1),
(2), (4) Date: Feb. 2, 2006

(87) PCT Pub. No.: WO2004/080111

PCT Pub. Date: Sep. 16, 2004

(65) Prior Publication Data

US 2006/0193270 A1 Aug. 31, 2006

(30) Foreign Application Priority Data

Mar. 4, 2003 (IL) .................................... 154745

(51) Int. Cl.
*H04W 4/00* (2009.01)
(52) U.S. Cl. ..................... 370/328; 370/338; 370/352; 370/540
(58) Field of Classification Search ................ 370/276, 370/281, 295, 328, 344, 338, 352, 535, 538, 370/540; 704/201; 600/411; 381/412, 408, 381/431
See application file for complete search history.

(56) References Cited

U.S. PATENT DOCUMENTS

| 5,311,541 | A | | 5/1994 | Sanderford, Jr. |
| 6,010,303 | A | * | 1/2000 | Feulner ....................... 415/118 |
| 6,148,225 | A | * | 11/2000 | Kestler et al. ................ 600/411 |
| 6,310,429 | B1 | | 10/2001 | Schyndel |
| 6,442,105 | B1 | | 8/2002 | Tubel et al. |
| 6,477,152 | B1 | | 11/2002 | Hiett |
| 6,487,219 | B1 | | 11/2002 | Snider |
| 6,594,052 | B2 | * | 7/2003 | Hiramatsu et al. ........... 398/140 |
| 6,765,930 | B1 | * | 7/2004 | Oikawa ....................... 370/479 |
| 7,239,625 | B1 | * | 7/2007 | Tse et al. .................... 370/349 |
| 2003/0046064 | A1 | * | 3/2003 | Moriya et al. ............... 704/201 |

FOREIGN PATENT DOCUMENTS

WO WO 00/21020 4/2000
WO WO 00/21203 4/2000

OTHER PUBLICATIONS

Grasimov V, et al "Things that talk: Using sound for device-to-device and device-to-human communication", ISM Systems Journal, (2000) vol. 39, No. 344, pp. 530-546.

* cited by examiner

*Primary Examiner*—Ian N Moore
(74) *Attorney, Agent, or Firm*—Browdy & Neimark, PLLC

(57) ABSTRACT

An acoustic transducer arrangement and system and method utilizing the same are presented. The acoustic transducer arrangement includes: an acoustic transmitter assembly including an array of transmitter elements operable to generate together a multi-frequency acoustic signal; and a control unit preprogrammed to operate the acoustic transmitter assembly in accordance with digital data stream indicative of a received signal to generate the multi-frequency acoustic signal indicative of the received signal.

32 Claims, 6 Drawing Sheets

METHOD AND SYSTEM FOR ACOUSTIC COMMUNICATION

FIELD OF THE INVENTION

This invention is generally in the field of communication techniques, and relates to a communication method and system utilizing acoustic signals.

BACKGROUND OF THE INVENTION

Acoustic computer communication techniques have been developed as an alternative to IR and RF wireless communication. Unlike IR and RF, acoustics does not suffer from such unexpected environmental conditions as sunlight, rain, metal objects, and can be "hidden" from people if its frequency is higher than 20 kHz. Indeed, IR usually requires direct visibility and is hampered by sunlight or bright interior light. Also, IR has such unexpected features as propagation through materials (that are not transparent in visible light) and reflection from various materials. RF, in turn, suffers from interference problems and can be blocked by metallic objects.

Various advantageous features of the acoustic-based communication, as well as examples for protocols for acoustic transmission, are disclosed in the following article: "Things that talk: Using sound for device-to-device and device-to-human communication", V. Gerasimov and W. Bender, IBM Systems Journal, Vol. 39, Nos 3&4, 2000, pp. 530-546. This article suggests using ultrasound for device-to-device communication and using audible signals when devices communicate to human listeners.

Methods for communicating with an electronic device utilizing acoustic transmission below 100 kHz are disclosed in WO 00/21020 and WO 00/21203. WO 00/21020 describes a smart card comprising a memory for storing information; at least one transmitting or receiving antenna (which may be acoustic antenna); and a low frequency circuit, for handling information associated with said antenna and said memory, which information is modulated at a modulation frequency of between 5 kHz and 100 kHz. WO 00/21203 describes a method of communicating with an electronic device via acoustic signals with the frequency below 50 kHz. This technique consists of providing a computer having an audible sound receiving and generating sub-system including a microphone; transmitting from a source at least one ultrasonic acoustic signal, encoded with information to the computer; and receiving said at least one signal by said microphone, to be detected by said computer.

SUMMARY OF THE INVENTION

There is a need in the art to facilitate communication between various devices by means of data transmission in the form of acoustic signals to enable fast transmission with high signal to noise ratio.

The present invention provides a novel method and system for acoustic communication capable of concurrently generating a modulated multi-frequency acoustic signal representative of the entire data sample (multi-bit data stream), and allowing for concurrently receiving and demodulating the entire data sample. This is implemented by using an array of acoustic transmitters and operating them to produce together a multi-frequency acoustic signal modulated in accordance with a data sample, and utilizing one or more acoustic receivers (preferably, at least two such receivers) for collecting a multi-frequency acoustic signal.

The present invention, according to its one broad aspect provides an acoustic transducer arrangement comprising: an acoustic transmitter assembly including an array of transmitter elements operable to generate together a multi-frequency acoustic signal; and a control unit preprogrammed to operate the acoustic transmitter assembly in accordance with a digital data stream indicative of a received signal to generate the multi-frequency acoustic signal indicative of the received data stream.

Preferably, the acoustic transducer arrangement also comprises an acoustic receiver assembly operable to receive a multi-frequency acoustic signal; and at least one input/output port for inputting/outputting a data stream in the form of at least one of the following signal formats: radio-frequency signal, infra-red signal, and electrical signal. The control unit is thus connected to the input/output port for receiving the data stream that is to be transmitted through the transmitter assembly as an acoustic signal and for outputting a data stream representative of the received multi-frequency acoustic signal, and is also preprogrammed to process data representative of the received acoustic signal to demodulate it into an output data stream.

Each of the transmitter elements has a resonance frequency different from that of the other elements and is independently operated by the control unit to generate an acoustic wave component. The multi-frequency acoustic wave, generated by the array of transmitter elements, is thus a superposition of sinusoidal signals of the multiple different frequency components. The resonance frequency of the transmitter element is preferably in a high ultrasound range, higher than 20 kHz.

The number of the multiple different frequency components may be equal to the number of the transmitter elements in the array. Alternatively, the acoustic transmitter assembly may comprise at least one electrically conductive membrane accommodated in a path of the acoustic wave component generated by the transmitter element and operable to oscillate with a frequency different from that of said acoustic wave component. In this case, the number of said multiple different frequency components forming the acoustic signal is higher than the number of the transmitter elements in the array, since two different frequency components are produced by the same transmitter element. One or more such electrically conductive membranes may be accommodated in the paths of all the acoustic wave components generated by the transmitter elements.

Preferably, the control unit is operable to modulate the data stream to be indicative of a network address of an associated communication station connectable to a communication network.

The acoustic signal may be frequency modulated in accordance with the data stream. For example, a presence of a specific frequency in the multi-frequency acoustic wave is indicative of binary "1" and absence of a specific frequency is indicative of binary "0". Alternatively, or additionally, the acoustic signal may be amplitude modulated.

According to another broad aspect of the present invention, there is provided an acoustic transducer arrangement comprising:

(i) at least one input/output port for inputting/outputting a data stream in the form of at least one of the following signal formats: radio-frequency signal, infra-red signal, and electrical signal;

(ii) an acoustic transmitter assembly comprising a piezo-electric element operable to generate an acoustic wave component with a first frequency corresponding to its resonance condition, and an electrically conductive membrane accommodated in a path of said acoustic wave component and operated to oscillate with a second frequency different from the first frequency, the acoustic transmitter assembly being thereby operable to concurrently produce a two-frequency acoustic signal;

(iii) an acoustic receiver assembly for receiving an acoustic signal;

(iv) a control unit connected to the input/output port for receiving the data stream that is to be transmitted through the transmitter assembly as an acoustic signal and for outputting a data stream representative of the received acoustic signal, said processor assembly being preprogrammed to operate the acoustic transmitter assembly to generate the two-frequency acoustic signal modulated in accordance with the received data stream, and to process data representative of the received acoustic signal to demodulate it into an output data stream.

According to yet another aspect of the present invention, there is provided an acoustic transmitter assembly for producing a multi-frequency acoustic signal, comprising at least one piezoelectric element operable to generate an acoustic wave component of a first frequency corresponding to the resonance frequency of the piezoelectric element, and an electrically conductive membrane accommodated in a path of said acoustic wave component and operable to oscillate with a second frequency different from the resonance frequency of the piezoelectric element, said multi-frequency acoustic signal being therefore a superposition of at least said first and second frequency components.

According to yet another aspect of the invention, there is provided a method for use in data exchange between communication systems, the method comprising:

(i) in response to a signal representative of a digital data stream, processing said data stream to translate it into a predetermined sequence of frequencies, and concurrently operating an array of acoustic transmitters to generate a multi-frequency acoustic signal in the form of a superposition of frequency components generated by the acoustic transmitters, respectively, and allowing transmission of said generated multi-frequency acoustic signal to another communication system; and (ii) upon receiving a multi-frequency acoustic signal, processing the signal in accordance with data indicative of a predetermined sequence of frequencies to thereby reconstruct a data stream encoded within the received acoustic signal.

The acoustic signals can be transferred between the communication systems via a network formed by a plurality of acoustic transducer arrangements connectable to the network and configured for communicating with each other via the network. In this case, the digital data stream is also indicative of the network address of the respective acoustic transducer arrangement.

According to yet another aspect of the invention, there is provided a method for using in data communication between remote communication systems, the method comprising generating an acoustic signal representative of a modulated data stream, wherein said acoustic signal is a superposition of different frequency components in accordance with a predetermined sequence of frequencies.

According to yet another aspect of the invention, there is provided a method for use in data exchange between communication systems, the method comprising utilizing an acoustic transducer arrangement configured to carrying out the following:

receiving an electrical, RF or IR signal encoded with data coming from a first communication system and addressed to a second communication system; converting the received signal into a corresponding digital data stream; processing said digital data stream to translate it into a predetermined sequence of frequencies; concurrently operating an array of acoustic transmitters of the acoustic transducer arrangement to generate a multi-frequency acoustic signal in the form of a superposition of frequency components generated by the acoustic transmitters; and transmitting the generated multi-frequency acoustic signal to a second acoustic transducer arrangement associated with the second communication system;

receiving an external multi-frequency acoustic signal encoded with certain data addressed to the first communication signal; and processing the received acoustic signal in accordance with data indicative of a predetermined sequence of frequencies to thereby decode the data.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1A:
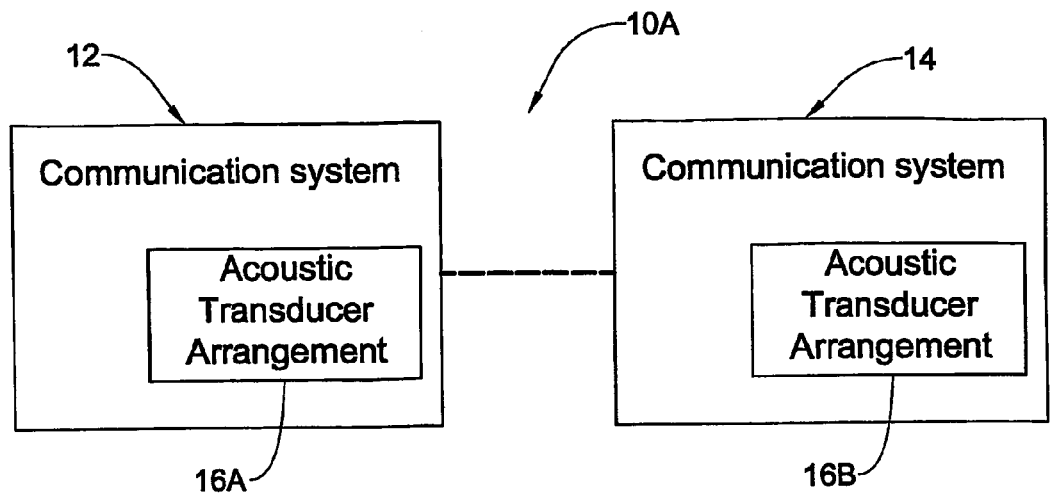
FIGS. 1A to 1C schematically illustrate several examples of a communication technique according to the present invention.

Referring to FIG. 1A, there is schematically illustrated an acoustic communication system 10A utilizing an acoustic transducer arrangement according to the invention. The system 10A is composed of first and second communication systems 12 and 14 (such as computer-, phone-, PDA-based systems) each associated with its own acoustic transducer arrangement, namely, is either connectable to the remote acoustic transducer arrangement via signal transmission or includes the acoustic arrangement as its constructional part. In the present example of FIG. 1A, the first and second systems 12 and 14 are equipped with the acoustic transducer arrangements 16A and 16B, respectively. The acoustic transducer arrangement 16A (or 16B) is configured as a chip with an embedded application preprogrammed for carrying out at least one of the following: transmission of encoded acoustic data signals; and receiving and decoding acoustic data signals.

When operating in the transmission mode, the acoustic transducer arrangement operates to receive an input electrical, IR, RF or acoustic data stream carrying a signal produced by the respective communication device, and to process the received data stream to generate an output encoded data carrying acoustic signal. When operating in the receiving mode, the acoustic transducer arrangement is capable of receiving an encoded acoustic data carrying signal and processing it to generate a decoded electrical, IR, RF or acoustic data signal to be used for the device operation. The construction and operation of the acoustic transducer arrangement will be described further below with reference to FIGS. 2-4.

Figure 1B:
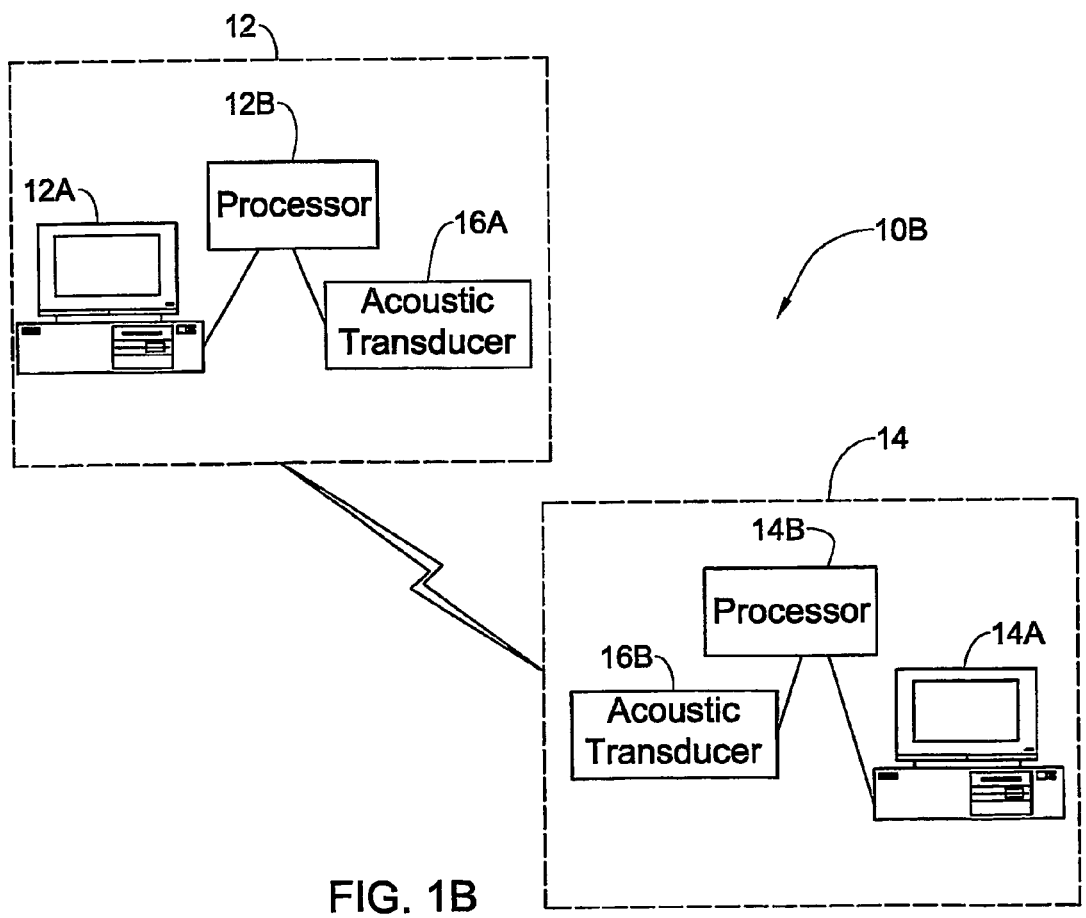

FIG. 1B more specifically illustrates a communication system 10B formed by two computer systems 12 and 14 configured for communication between them via acoustic signal transmission. The system 12 includes a computer device 12A and an acoustic transducer 16A, which is connected to the computer device 12A via a processor unit 12B configured for carrying out digital signal processing (DSP) and digital-to-analog (D/A) and analog-to-digital (A/D) signal conversion. Similarly, the system 14 includes a computer device 14A and an acoustic transducer 16B, which is connected to the computer device 14A via a processor unit 14B configured for DSP, D/A and A/D functions.

Each of the transducers 16A and 16B is configured for both the data transmission and data receiving modes. Considering data transmission from the computer device 12A to computer device 14A, the system 10B operates in the following manner:

The computer device 12A generates a digital data stream indicative of specific information addressed to computer 14A. To this end, the computer device utilizes an appropriate computer program and encoding utility typically provided in a computer device. This digital data stream is processed in the computer system 12 (in the processor unit 12B) to be converted into an analog electronic signal, which operates the acoustic transducer 16A. The latter processes the received electronic signal to convert it into an acoustic signal indicative of the encoded information, and outputs the signal to be transmitted to the computer system 14.

At the system 14, the acoustic signal is received and processed by the acoustic transducer 16B to be converted into an electronic signal, which is then processed by the A/D and DSP of the processor unit 14B. Then, the so-processed digital signal is decoded and appropriately used by the computer device 14A (e.g., for operating a certain computer program and/or to be displayed on the computer monitor).

Figure 1C:
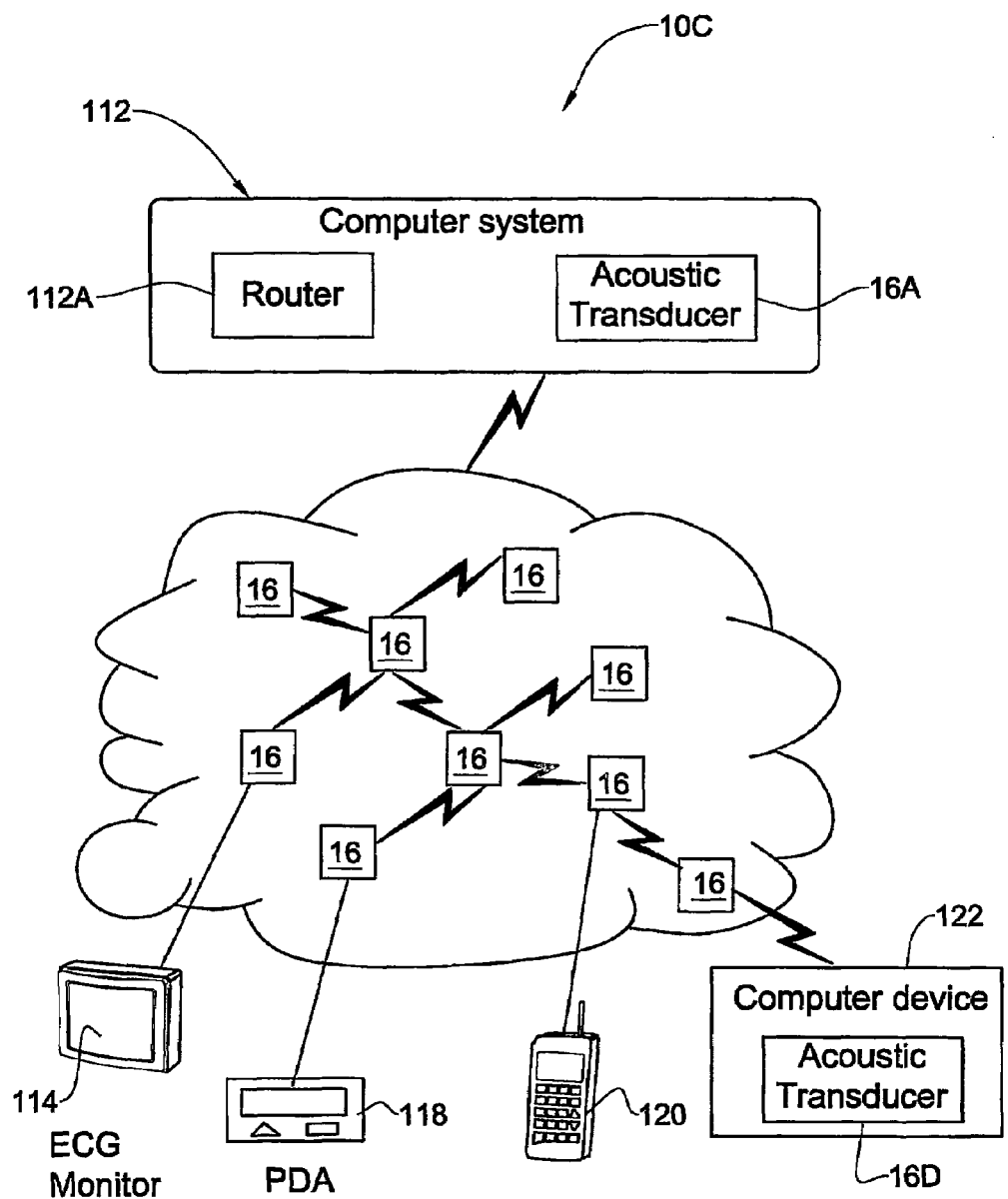

Referring to FIG. 1C, there is exemplified an acoustic communication system 10C utilizing an acoustic network formed by the acoustic transducer arrangements according to the invention. The system 10C is thus formed by various communication stations 112, 114, 118, 120 and 122 connectable to each other via a communication network formed by an array of acoustic transducer arrangements, generally at 16.

Generally, each of the communication stations 112-122 can be configured as a server system capable of producing various data streams and appropriately distributing (routing) them in between the other stations, and being responsive to data signals coming from the other stations via network. In the present example of FIG. 1C, the station 112 is configured as a server system, and the stations 114-122 are configured as client stations.

It should be understood that the terms "server" and "client" used herein solely refer to the existence and absence, respectively, of a router utility in the station. It should also be understood that each of the communication stations may comprise its associated acoustic transducer arrangement as a constructional part, or be connectable to a stand-alone (e.g., remote) acoustic transducer arrangement.

The communication station 112 (server) is a computer system equipped with a data generating and processing utility (not shown) and a router utility 112A, which is in turn equipped with or connected to the acoustic transducer arrangement 16A. The communication stations 114-122 are constituted by, respectively, a medical measuring device (e.g., ECG), PDA device, mobile phone device, and a PC device. These devices 114-122 may and may not be equipped with the acoustic transducer arrangements. In the present example, the PC 122 is equipped with the acoustic transducer arrangement 16D, and the other devices 114-120 have no integral acoustic transducers and receive electrical, RF or IR signals (as the case may be) presenting a conversion of the acoustic data signal from the associated remote acoustic transducer arrangement 16, which comprises an output utility configured for outputting electric, RF, IR and/or acoustic signal representative of the received data, as will be described more specifically further below.

The system 10C operates in the following manner. The computer system 112 (its data generator/processor) produces a digital data stream to be transmitted to a specific communication device, e.g., the ECG station 114, via the communication network. The router utility 112A performs appropriate formatting of this data stream to be addressed to the specific communication device via corresponding one or more nodes of the network The acoustic transducer arrangement 16A, which is a node of the acoustic network, receives the formatted data stream, converts it into an encoded acoustic signal and allows the transmission of this signal via the network.

It should be understood that the router is preprogrammed to utilize an appropriate hash table representative of network addresses of the transducer arrangements forming the network along with their associated names, and preferably also utilizes a segmentation map representative of a list of this IDs and names attached with the last known segment ID. The segmentation process thus consists of the following: the router that has previously transmitted a message to a specific segment ID, waits for a notification from the transmitting element indicative of that the specific network address along with the associated name corresponds to that segment, and if not, the router retransmits the message to all the segments. In the example of FIG. 1C, where the acoustic network is utilized, each acoustic transducer arrangement is assigned with its unique identification code (network address) and these IDs are used for routing the data streams in between the communication stations. In this specific example, each of the acoustic transducer arrangements is preferably preprogrammed to identify the incoming signal to either process it as described above or just allowing the signal to be appropriately distributed to another acoustic transducer arrangement or the communication station.

Figure 2:
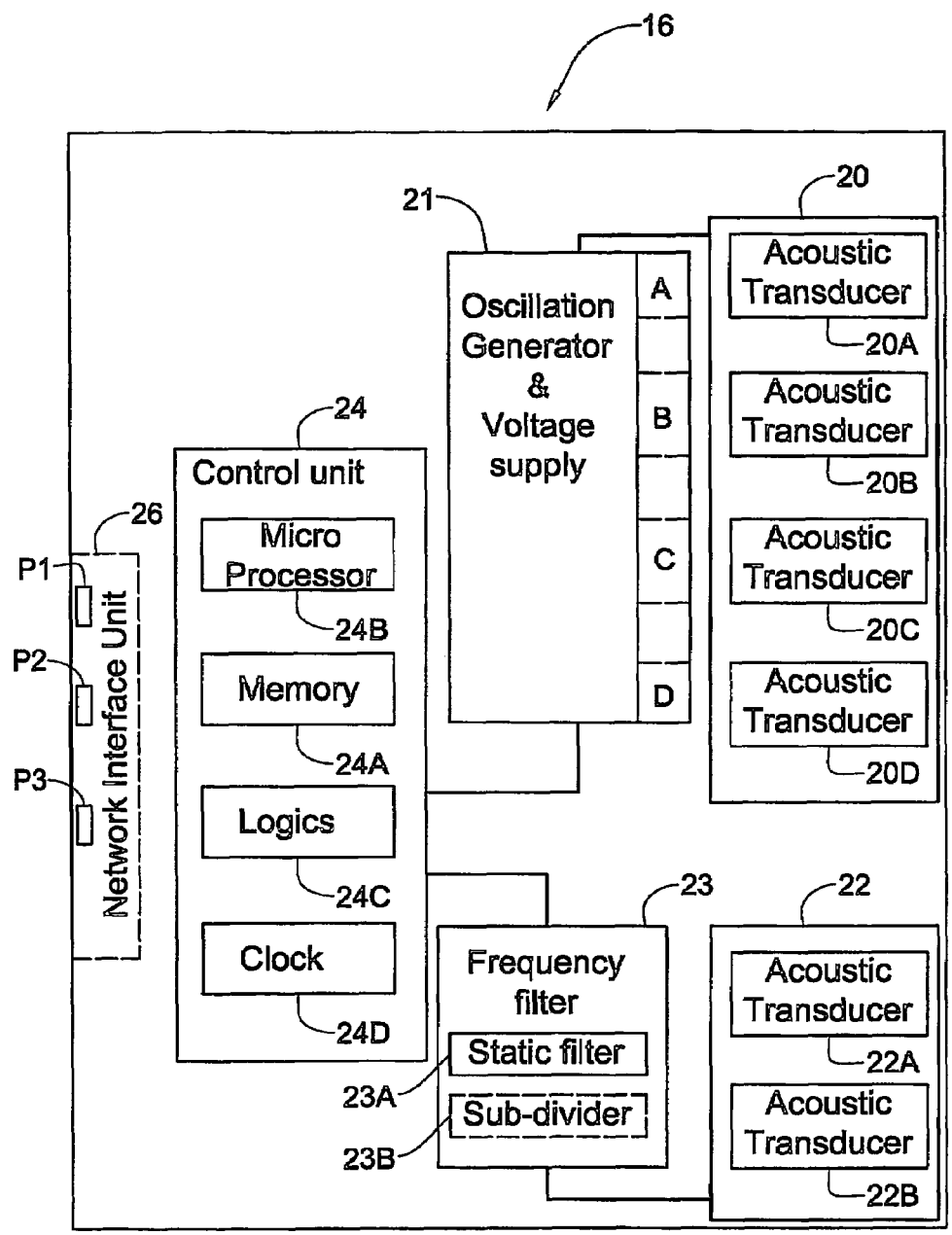
FIG. 2 schematically illustrates an acoustic transducer arrangement according to one embodiment of the invention.

Reference is now made to FIG. 2 exemplifying the construction of the acoustic transducer arrangement 16 according to the invention. The transducer arrangement 16 is designed like an electronic card (chip with embedded application) and comprises an acoustic transmitter assembly 20, an acoustic receiver assembly 22, a control unit 24 that is connectable to the transmitter and receiver assemblies and to a network interface unit 26. The network interface unit 26 includes one or more signal input/output ports—three such ports $P_1$-$P_3$ being shown in the present example configured for inputting/outputting RF, IR, and electrical signals, respectively.

The transmitter assembly 20 is composed of an array of acoustic transmitters (e.g., piezoelectric crystal elements)—four such transmitters 20A-20D being shown in the present example, operable by the control unit 24 via an oscillation generator and voltage supply assembly 21. According to the technique of the present invention, the operational frequencies of the acoustic arrangement are of the ultrasound range, higher than 20 kHz.

The receiver assembly 22 comprises one or more acoustic receivers (e.g., piezoelectric crystals)—two such receivers 22A and 22B being shown in the present example. The received acoustic data is transmitted to the control unit 24 via a frequency filter arrangement 23, which includes a "static"

filter 23A that blocks frequencies below the selected ultrasound range, and, in the case of more than one receiver, includes also a frequency sub-divider unit 23B.

The known piezoelectric phenomenon consists of converting a mechanical deformation into a voltage, and the counter piezoelectric phenomenon consists of converting a voltage into a mechanical deformation. The piezoelectric element is typically formed by a substrate of a piezoelectric material (quartz resonator) that is preferably very thin (of about several micrometers) to enable the generation of high frequency acoustic waves; and includes electrodes on opposite faces of the substrate. The electrodes are connected to a high-frequency voltage source, which operates through the electrodes to cause the lengthwise vibration in the piezoelectric substrate.

The present invention provides for combining several piezoelectric crystal elements 20A-20D together to concurrently produce a wide-range multi-frequency acoustic signal, and to enable modulation of these frequencies (i.e., perform a signal encoding) in accordance with a data stream to be transmitted. This enables simultaneous transmission of multiple frequency components indicative of a multi-bit data stream sample (formed by one or more "words"), rather than bit-by-bit transmitting a data sample using a single transmitter element. Since in order to generate an acoustic wave of a specific frequency by a piezoelectric crystal, the voltage supply is to satisfy the resonance condition of the crystal, the higher the number of crystals in the transmitting array, the more frequencies can be concurrently generated.

As for the receiver assembly 22, generally, the provision of one receiver would be sufficient for the purposes of the present invention, but preferably at least two such receivers (i.e., receiver array) are used thereby allowing detection of a wide range of acoustic wave frequencies and concurrent decoding of the entire received sample. It should, however, be understood that since the acoustic signal detection is not limited by the resonance condition of the crystal, the receiver array may include a smaller number of crystal elements than the transmitter array.

The control unit 24 includes a memory (RAM) 24A, a microprocessor 24B that is connected to the oscillation generator 21 and to the filter arrangement 23 via a logic utility 24C and a clock utility 24D. It should be noted, although not specifically shown, that also provided in the transducer arrangement 16 are such functional utilities as an D/A-A/D converter, and amplifiers for amplifying the input signal to be converted into an encoded acoustic signal and amplifying the electrical signal representative of the received acoustic signal.

Figure 3:
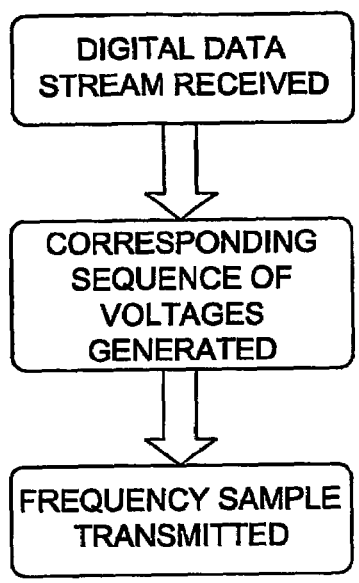
FIG. 3 illustrates flow diagrams of the main operational steps of the generation of a modulated acoustic wave indicative of a data sample, and the demodulation of a received multi-frequency acoustic wave.
Figure 3:
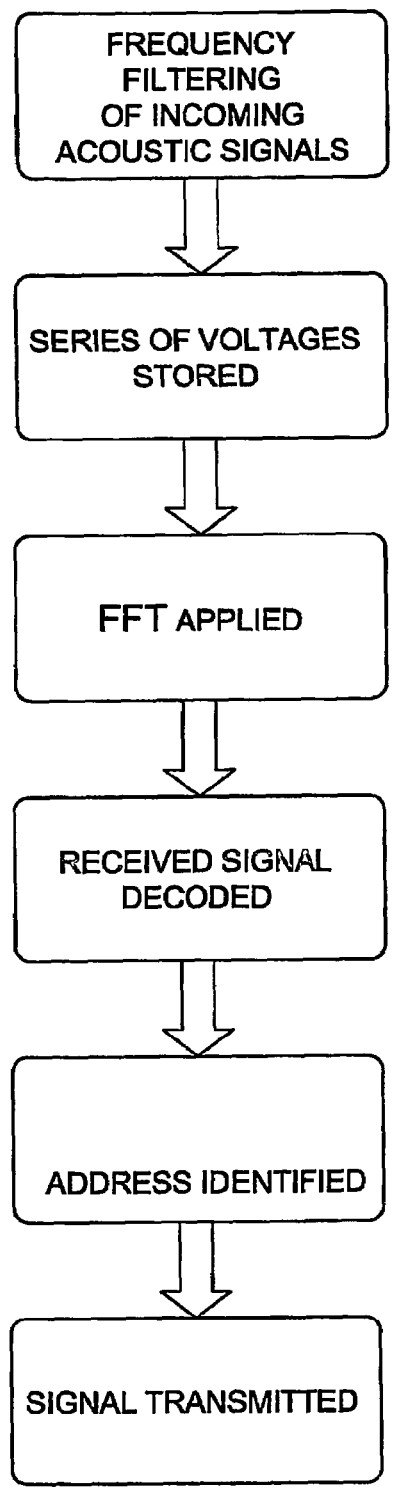

The operational steps of the acoustic transducer arrangement 16 will now be described with reference to FIG. 3. In the data transmission mode, the acoustic transducer arrangement 16 operates as follows:

The control unit 24 receives a digital data stream from one of the input utilities (or from the router, or directly from the data generation of a computer device, medical device or any other kind of data generator as the case may be), and stores the received digital data stream in an appropriate format.

The control unit 24 processes the received digital data stream by slicing it into samples that are of a predefined fixed length (e.g., 4 or 8 bits in a sample). For example, 106 Hexadecimal values can be used, each Hexadecimal value being representative of 4 bits, thus having 53 samples. The control unit 24 (the clock and logics thereof) then operates to generate a corresponding sequence of voltages in accordance with the predefined order of the transmitters' frequencies in the array.

The so-produced sequence of voltage it used to operate the oscillation generator 21 to provide the respective voltage-sample. The oscillation generator 21 thus operates the transmitters 20A-20D via their electrode assemblies to simultaneously produce acoustic signal components representative of the data sample. To this end, each of the transmitters is responsible for generating an acoustic wave of a predefined frequency (corresponding to its resonance condition), and preferably also predetermined amplitude, as will be described further below.

The multiple-transmitter assembly 20 (crystal elements 20A-20D) is thus operable to concurrently produce a multi-frequency acoustic wave indicative of a data sample to be transmitted. As will be described further below with reference to FIG. 4, a two-frequency acoustic wave can be achieved with a single crystal.

In the receiving mode, the transducer arrangement 16 operates as follows:

Each of the acoustic receiving elements 22A and 22B always "listens" for incoming signals, i.e., is continuously responsive to incoming acoustic signals to cause the generation of respective voltage outputs. As the incoming signals generated by the acoustic transducer arrangement of the present invention are in a specific, very high range of acoustic frequencies, a simple high pass band filtering can be used. Thus, the voltage output of the receivers undergoes high-pass frequency filtering, namely voltages corresponding to frequencies outside the predetermined range (e.g., lower than the predetermined range, i.e., lower than 20 kHz) are prevented from being detected; and undergoes the sub division in accordance with the frequency ranges of the receivers.

The filtered signal (after being sampled from the piezoelectric crystals) is stored in a Pulse Code Modulation (PCM) wave format, which is practically the voltage representation of the sampled crystals, and the data sample can therefore be stored in a RAM unit. The logic utility thus identifies the timing of the incoming frequencies, and operates together with the microprocessor to store the voltage values in the RAM.

Then, the microprocessor operates to apply the Fast Fourier Transform (FFT) to the stored voltage series. The result of the FFT is the frequency map indicative of which frequency represents digital "0" and "1" values.

The microprocessor analyzes the frequency map and performs an error correction to restore (decode) the received signals.

Having decoded the received signal, the control unit 24 identifies the ID of an electronic device to which this specific data stream is addressed, and actuates the selective port to transmit the signal to the respective communication device in the form of RF, IR or electrical signal. The case may be such that while decoding the first received signal, the microprocessor identifies that the signal is addressed to another acoustic arrangement of the network (i.e., identifies the network address of the specific acoustic arrangement appearing in the first received sample). In this case, the control unit will operate the transmitter assembly 20 accordingly to retransmit the received signal in the acoustic form via the network.

The use of multi-frequency acoustic waves based communication (multi-frequency transmission at a given time) enables frequency modulation or frequency and amplitude modulation of the acoustic signal to be indicative of the entire data sample. This features of the acoustic transducer arrangement of the present invention allows for its advantageous use in device-to-device communication, as compared to the proposed prior art technique (utilizing a single pair of acoustic transmitter and receiver) and to the conventionally used electromagnetic waves based communication where only one frequency can be received (and therefore broadcasted) at a given time (limited by a tuning problem). Another advantageous feature of the technique of the present invention is the operation with high-frequency acoustic waves and specific signal modulation (as exemplified above and as will be exemplified further below), which requires much less sophisticated noise-filtering techniques, as compared to the known communication techniques.

Thus, in the transmission operational mode, the control unit operates to apply a frequency coding to the acoustic signal, such that the generated acoustic signal is a superposition of sinusoidal signals of multiple frequency components indicative of a multi-bit data stream sample. In the receiving operation mode of the transducer arrangement, the control unit processes the electrical outputs of the receiver(s) (22A and 22B in FIG. 2) to concurrently decode the received multi-frequency coded multi-bit data sample by applying a time-to-frequency domain transformation (Fourier transform) thereto, thereby obtaining a multi-bit spread spectrum. This spectrum is analyzed, preferably using an error correction, to identify the predetermined frequencies within the received sample and to translate the sample into a digital data stream.

The encoding of the multi-frequency acoustic wave indicative of a data sample may consist of the following. The first transmitter in the array (transmitter 20A) is operable to generate the so-called "basic frequency", e.g., $f_1=50$ kHz, and all the other transmitters 20B-20D generate frequencies spaced from the basic frequency a predefined spacing, such that $f_2=51$ kHz, $f_3=52$ kHz, $f_4=53$ kHz, respectively. The existence or absence of the specific frequency in the transmitted frequency-sample is indicative of respectively logic "1" or "0". It should be understood that this is a specific example of the number of transmitters in the array and the frequency values and spacings between them. Using a higher number of transmitters enables concurrently transmitting a larger data sample. Thus, a wave-form signal is created by concurrently transmitting all the four frequencies during a predefined fixed time length (for example 200 milliseconds).

For example, the 4-bit word "1001" (data sample) can be transmitted by concurrently generating frequencies $f_1$-$f_4$ at amplitudes $A_1=90, A_2=0, A_3=0, A_4=90$. The data sample may also be amplitude modulated. This modulation may be based on a predefined range for each of the amplitudes $A_1$-$A_4$; and/or a specific key, e.g., the sum of amplitudes of $1^{st}$ and $3^{rd}$ bits and $2^{nd}$ and $4^{th}$ bits in the sample, or an amplitude difference between the adjacent frequencies in the received frequency stream. In other words, the amplitudes of the existing frequencies can be varied in a certain predefined order, known to the receiver. For example, the amplitude difference being higher than a certain predefined threshold is considered as corresponding to "1", and the amplitude difference being lower than the threshold is considered as corresponding to "0".

While decoding (demodulating) the received signal, the appropriate error correction is carried out. Considering the simple amplitude modulation of the acoustic signal, the error correction can be based on checking for the amplitudes order in the received signal, or a certain threshold for an amplitude difference between the adjacent frequencies in the received frequency stream.

The following is a specific, non-limiting example, of encoding the acoustic signal to concurrently transmit a data sample in the form of two 4-bit words, and an error correction performed while decoding the received signals. In this specific example, four-element transmitter assembly is considered, and the operational (resonance) frequencies of four crystal resonators are $f_1=50$ kHz, $f_2=51$ kHz, $f_3=52$ kHz, and $f_4=53$ kHz, respectively. Thus, the signal encoding utilizes the specific order of frequencies $f_1$, $f_2$, $f_3$, $f_4$ in the four-frequency acoustic signal. Additionally, in order to enable concurrent transmission of the entire data sample formed by two 4-bit words, the acoustic signal is amplitude modulated. The amplitudes used for transmitting the frequencies $f_1$-$f_4$ are for example as follows: $0<A_1<30$; $30<A_2<60$; $60<A_3<90$; $90<A_4<127$. In order to enable error correction at the receiving side, a certain key is used, for example "0101010 . . . ".

Let us consider the transmission of 4-bit words $W_1=1000$, $W_2=1010$, $W_3=1001$, $W_4=0001$, $W_5=0010$ and $W_6=1001$, wherein two 4-bit words $W_1$ and $W_2$ present the first data sample to be concurrently transmitted by four crystal resonators, two 4-bit words $W_3$ and $W_4$ present the second data sample, and two 4-bit words $W_5$ and $W_6$ present the third data sample. When transmitting the first data sample, four crystal resonators generate acoustic signals representative of symbols "11", "00", "01" and "00", respectively. The position of each symbol in the sample is represented by the respective frequency in accordance to the predefined order of frequencies. According to the selected key, symbol "11" when appearing for the first time or for the first time after transmission of symbol "00" is represented by the maximal value of amplitude $A_4$, i.e., 127, and a further appearing of this symbol prior to "00" is represented by any other value of $A_4$ range, preferably the center point of the range. Consequently, symbol "00" is represented either by the minimal value of amplitude $A_1$, i.e., zero (when appearing for the first time after symbol "11"), or by any other value of $A_1$ range (preferably, the center point of this range). Symbols "01" and "10" are represented by amplitudes $A_2$ and $A_3$, respectively, preferably at the center values of the selected ranges. Thus, in this specific example, the multi-frequency acoustic signal representative of six 4-bit words contains three sequentially generated data samples, wherein each sample is concurrently generated as a four-frequency acoustic signal: ($f_1=127$, $f_2=0$, $f_3=45$, $f_4=15$), ($f_1=65$, $f_2=15$, $f_3=15$, $f_{4=127}$), ($f_1=45$, $f_2=0$, $f_3=75$, $f=45$). At the receiver side, this acoustic signal is translated using the above key, and upon detecting an error (no correspondence with the key), the respective sample is identified and transmitted back with a request for retransmitting the sample again.

Another possible example of signal encoding/decoding consists of using second harmonics of each frequency in the sequence. In this case, the resonance frequency of each transmitter (crystal resonator) is selected to be other than the second harmonic of another resonator frequency. Thus, alternatively to the above-described amplitude modulation or in addition thereto, the second harmonic of each resonant frequency may be used as a key for encoding the signal and carrying out the error correction.

Figure 4:
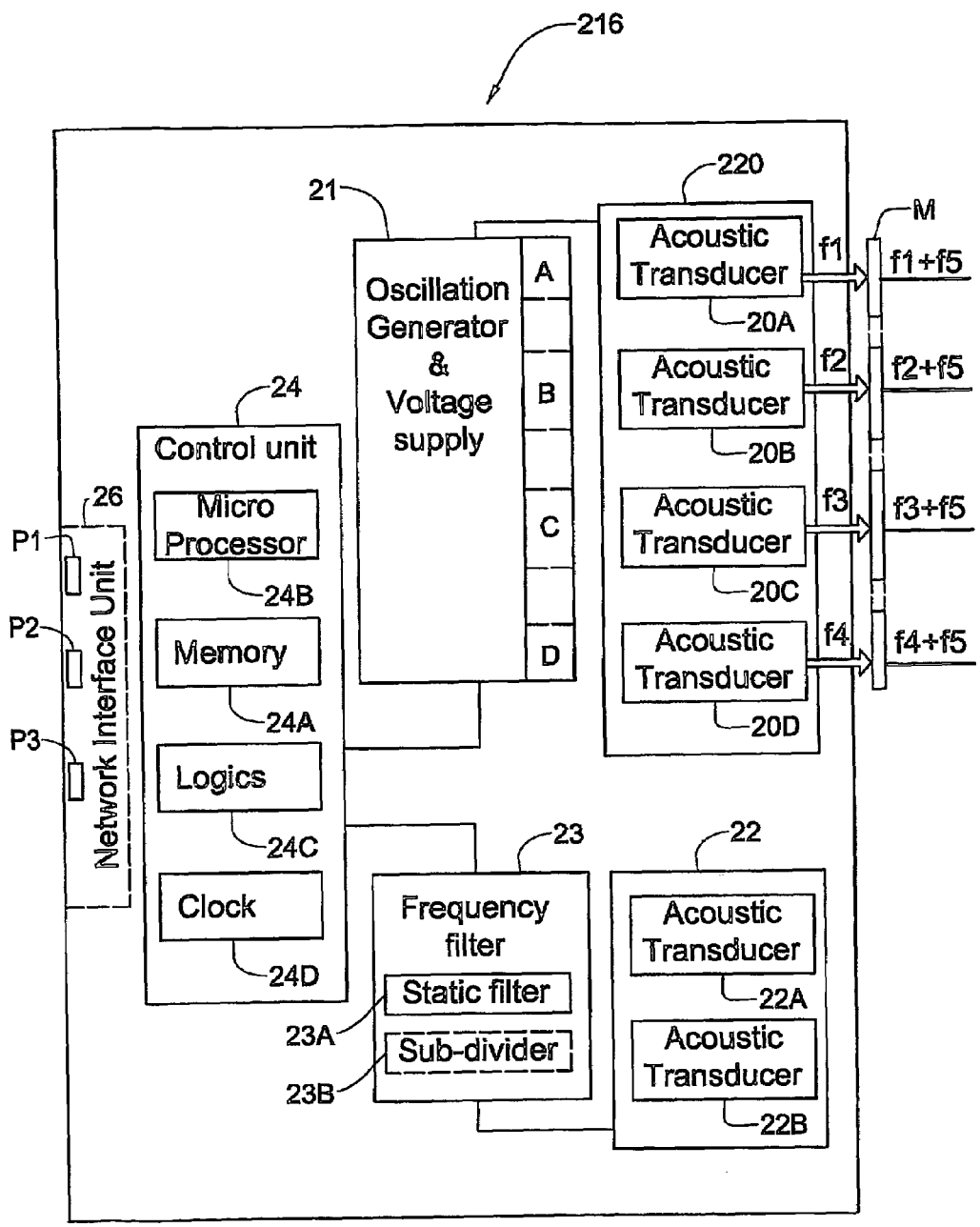
FIG. 4 illustrates the acoustic transducer arrangement according to another embodiment of the invention.

As indicated above, a transmitter in the multi-transmitter assembly can generate a two-frequency acoustic wave while utilizing a single crystal resonator. This is schematically illustrated in FIG. 4. To facilitate understanding, the same reference numbers are used to identify those components that are common in the examples of FIGS. 2 and 4. An acoustic transducer arrangement 216 of FIG. 4 has a transmitter assembly 220 equipped with at least one electrically conductive membrane M (thin electrode) associated with one or more crystal elements in the array. In the present example, the membrane (or four separate membrane segments) is provided at the output of all the crystal resonators. If the membrane is in its inoperative position (no voltage is applied to the membrane), a single-frequency acoustic wave generated by the respective crystal resonator propagates through the membrane while being unaffected by the membrane.

If the membrane is shifted to its operative position by applying a certain voltage thereto, this results in a membrane vibration with a certain frequency (typically slightly different from the resonance frequency of the respective crystal element). Considering the acoustic transmitter element 20A: in the inoperative position of the membrane, a signal component produced by this acoustic channel has a frequency $f_1$ corresponding to the resonance frequency of said membrane segment; and in the operative position of the membrane oscillating with a frequency $f_5$, the signal component of this acoustic channel has a frequency of $(f_1+f_5)$. The other acoustic channels operate in a similar manner, as shown in the figure in a self explanatory manner.

Hence, the passage of a single-frequency acoustic wave generated by a specific crystal element through the operative membrane will result in a two-frequency acoustic wave. Thus, eight-frequency acoustic wave (8-bit data sample) can be produced by four-crystal array with membranes. If appropriate amplitude modulation is used, for example that described above, 16-bit data sample can be generated by the four-transmitter assembly with membranes.

Figure 5:
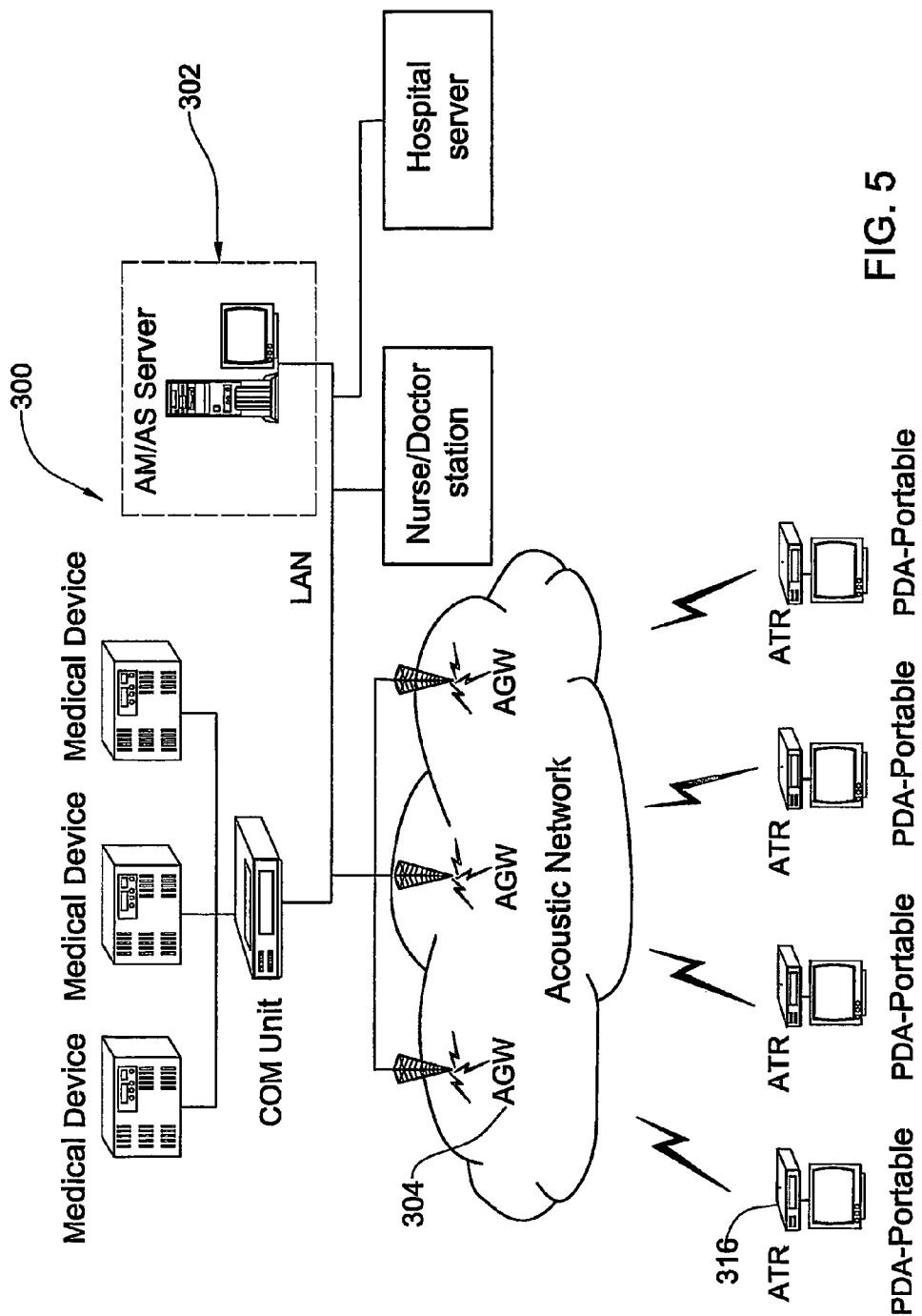
FIG. 5 exemplifies how the present invention can be used to provide communication between medical devices and physician's personal portable units within a hospital.

Reference is now made to FIG. 5 showing a specific non-limiting example of how the present invention can be used to provide communication between medical devices (and/or any other devices) located in a hospital, wherein such devices may include an Intensive Care Unit or Intermediate Care Unit associated with a patient being monitored and portable units (PDAs) carried by the medical staff. A system, generally at 300 is configured as an Acoustic Medical Intelligent Alert System (AMIAS). The system is formed by multiple communication devices, each associated with a respective station in the hospital, and connected to an acoustic network formed by acoustic transducer arrangement of the present invention. In the present example, each portable unit (PDA) carried by doctors is associated (equipped) with its own acoustic transmitter/receiver ATR constructed as described above with reference to FIG. 2 or 4, and the acoustic network is formed by the so-called "Acoustic Gateways" or (AGW) that are actually acoustic transmitter/receivers of the present invention but are functionally distinguished from ATRs in that AGW is a stationary mounted unit coupled to the LAN while ATR is a mobile unit that can be attached to the PDA (or another portable computer or monitoring device) or integrated with the PDA as a chip with embedded application.

The AMIAS 300 utilizes Acoustic Wireless Local Area Network (AWLAN) communication and is targeted to serve places in which there is a need for alert messages to be transferred immediately from the generating device to various destinations where high frequency transmission is forbidden for use. This is achieved by using a high frequency acoustic transmission technique (ultrasound) of the present invention enabling for providing either a complementary service to organizations that are already using RF based WLAN systems or a complete solution to organizations which do not have any type of WLAN support. The AMIAS 300 solves a major obstacle which prevents any traditional WLAN, based on radio frequency transmission, from being used in places where mission critical sensitive medical equipment is located and operated and is subject to malfunction due to RFI caused by the RF WLAN system.

The system 300 is thus formed by a central station 302 (AMIAS server); the acoustic network represented by a plurality of AGWs, generally at 304; and a plurality of ATRs 316 each associated with a respective portable unit (PDA) of the medical stuff. The AMIAS server 302 is connected to a Hospital Server (via wires or wireless), and is connected via a local area network (LAN) of the hospital to the acoustic network to a Nurse/Doctor Station and a plurality of medical device associated with patients.

The AMIAS is configured and operated to transfer emergency alerts generated by the medical devices to their destinations. The medical devices thus serve as the input sources to the system.

To enable a medical device to communicate with the AMIAS server, the medical device has an output interface to which all alerts and related information are transferred, and an output interface for transmitting all relevant information in digital format to the AMIAS server 302. The main functions of the medical device include: analysis of signals received from a respective monitoring system associated with a patient, generation of emergency alert and data related to the alert situation, and transmission of the alert and related data to the output interface of the device.

It should be noted that the medical devices can be hooked directly to the AMIAS server or via their dedicated ATRs. Direct connection is implemented using such communication methods as wired LAN or Phone system (using the hospital's infrastructure).

As shown in the figure, the medical devices are connected to the LAN via a COM unit, which is an electronic unit configured to operate like a switch or hub that distributes information coming to/from the server 302 to the AGWs and computers or other devices. COM unit thus provides an interface between various types of medical devices to the AMIAS server (via LAN).

The ATR 316 is a two way acoustic transducer configured as described above with reference to FIG. 2 or FIG. 4. The ATR receives digital electronic data from the respective PDA and converts it into an acoustic signal that is being transmitted to other components of the system, and receives acoustic signal coming from the network (AGW) and converts it into a digital format to be presented at the PDA. ATR can be hooked to several types of medical devices, portable units and interfaces between each of them and the nearest AGW 304. The main functions of the ATR 316 include: provision of interface software between the AGW 304 and the medical devices; interface software between the AGW and the AMIAS server 302; and interface between the AGW 304 and a Portable Unit.

The AGW 304 is a two way acoustic transducer configured similar to ATR 316, for maintaining the acoustic network. AGW is a gateway that communicates with all acoustic ATRs and with the AMIAS server. AGW can receive digital electronic data or RF data, convert it into acoustic signal and transmit the signal to the addressed utility of the system, as well as receive acoustic signals, convert them to digital electronic or RF data and transmit it through wire or RF communication. The AGW is thus configured to provide an interface between the AMIAS server and the ATRs connected to the medical devices; and an interface between the AMIAS server and the ATRs connected to portable units.

The portable PDAs serve as remote monitors to which all alert information is addressed. They are carried by authorized personnel allowing them to receive all emergency information as it is transmitted, regardless of their location. The portable PDA is configured for communicating with the acoustic network through ATR, upon receiving an alert generating an alarm signal (buzzer or vibration) and displaying information on a local screen, thus allowing users to generate a response to the alarm generator either by keyboard, keypad, touch screen or any kind of interface.

The AMIAS server 302 is a computer server including all the information required to control the system operation. It serves as a central point of the system and is configured for carrying out the following: receiving all the alerts and related data coming from the medical devices (through ATRs or LAN), processing the received alerts and related data and adding required information retrieved from the central database, addressing the alert and related data to the appropriate portable unit(s), receiving responses from the portable units and addressing the responses to appropriate destinations and to the Nurse/Doctor station, communicating with the Nurse/Doctor station, and communicating with the main hospital server. The AMIAS server maintains the database (or is connected to the database at the hospital server) of all data necessary to manage day to day operation of the alert system as well as its history. The AMIAS server allows several levels of authorization for conducting different operations.

Nurse/Doctor station is a PC based station appropriately located in the department. More than one station can be used within the same department. This station is used by "on duty" doctor and/or nurse to monitor all the activities of the system 300 (over the network). This station displays medical status of all activity to the "on duty" nurse/doctor, allows this nurse/doctor for generating alarm to each one of the portable devices, and for generating a response to any given alarm.

The hospital server contains medical information as well as administrative information regarding all the patients in the hospital. The hospital server actually serves as input/output channel for the AMIAS server. With regard to the AMIAS server, the hospital server carries out the following: provides necessary administrative information to the AMIAS server while setting up the AMIAS server, provides medical information to the AMIAS server upon request from one or more portable units, and collects the AMIAS activity information from time to time and updates it in the database.

Thus, the system 300 operates as follows: The medical device, while monitoring certain condition(s) of a specific patient, identifies an alert condition, generates digital data indicative thereof (containing all critical situation related information), and transmits this data either directly to the AMIAS server (through the respective COM) or to the local ATR connected to the medical device. The data sent through the ATR will be converted by this ATR to acoustic signal and transmitted to the nearest AGW. The acoustic signal received by the nearest AGW, will be converted to digital data and transferred to the AMIAS server (alternatively, the data is directly received by the AMIAS server via the COM unit).

The AMIAS server processes the received digital data, retrieves necessary information from the database, adds this information to the received data, identifies the destination and sends modified message (after deleting irrelevant information and adding complementary information as retrieved from the AMIAS server) to the AGWs and also to Nurse station via the LAN.

At the AGW, the received data is converted into acoustic signal and transmitted through the acoustic network. The portable device carried by authorized personal (doctor, nurse or any other authorized medical team member) receives the acoustic signal via its local/attached ATR. The latter converts the acoustic signal into digital data and transfer it to the PDA, which in turn generates alarm sounds and/or vibrations and displays data on its local screen to be read by the person carrying the portable unit. The authorized person (doctor) operates his portable unit to respond to the message. This response is transmitted in digital form to the local ATR of the portable unit. The ATR converts this digital data into acoustic signal and transmits it to the nearest AGW. This acoustic signal is received by the nearest AGW, converted to digital data and transferred by to the AMIAS server via the LAN. At the AMIAS server, the response is processed and transmitted to the Nurse/Doctors stations via the LAN.

The system 300 can operate in two modes: complementary mode or full service mode. The complementary mode supports cases in which the hospital is already using existing WLAN environment except for areas that are specifically sensitive to RFI segments and that could and should be covered by AMIAS. In this mode, there is no need to support the full system functionality and it can take advantage of the existing environment such as database and other software features. The full service mode supports cases in which the hospital has no WLAN solution, and therefore the system provides complete and enhanced control functionality. Thus, the technique of the present invention provides for using acoustic-only data communication network or a combination of the acoustic network with the conventional LAN or RF network. The present invention thus provides a complete solution for fast and safe communication between various devices, and especially provides benefit for communication within a hospital.

Those skilled in the art will readily appreciate that various modifications and changes can be applied to the embodiments of the invention as herein before exemplified as defined in and by the appended claims.

The invention claimed is:

1. An acoustic transducer arrangement comprising: an acoustic transmitter assembly including an array of transmitter elements configured to generate together a multi-frequency acoustic signal, the acoustic transmitter assembly comprising at least one electrically conductive membrane accommodated in a path of an acoustic wave component generated by one or more of the transmitter elements and operating to oscillate with a frequency different from that of said acoustic wave component, a number of the multiple different frequency components forming the acoustic signal being thereby higher than the number of the transmitter elements in the array; and a control unit preprogrammed to operate the acoustic transmitter assembly in accordance with a digital data stream indicative of a received signal to generate the multi-frequency acoustic signal indicative of the received data stream.

2. The acoustic transducer arrangement of claim 1, comprising an acoustic receiver assembly configured to receive a multi-frequency acoustic signal, the control unit being preprogrammed to process data representative of the received acoustic signal to demodulate it into an output data stream and for operating an output utility to output the demodulated data, representative of the received multi-frequency acoustic signal, in a predetermined format.

3. The acoustic transducer arrangement of claim 2, wherein the acoustic receiver assembly comprises at least two acoustic receivers.

4. The acoustic transducer arrangement of claim 2, wherein the demodulation of the received acoustic signal includes an error correction.

5. The acoustic transducer arrangement of claim 4, wherein the error correction utilizes a certain key in the form of a predetermined digital stream periodicity in the received acoustic signal.

6. The acoustic transducer arrangement of claim 2, wherein the control unit is configured to apply an amplitude modulation to the frequency components, the demodulation of the received acoustic signal including an error correction, the error correction being based on one of the following: checking for the amplitudes order in the received acoustic signal;

and checking for a certain threshold for an amplitude difference between the adjacent frequencies in the received frequency stream.

7. The acoustic transducer arrangement of claim 1, comprising at least one input and output port for inputting and outputting a data stream in the form of at least one of the following signal formats: radio-frequency signal, infra-red signal, and electrical signal, the control unit being connected to the input and output port for receiving the data stream that is to be transmitted through the transmitter assembly as an acoustic signal.

8. The acoustic transducer arrangement of claim 1, wherein each of the transmitter elements of the transmitter assembly has a resonance frequency different from that of the other elements and is independently operated by the control unit to generate an acoustic wave component, the generated multi-frequency acoustic signal being a superposition of sinusoidal signals of the multiple different frequency components.

9. The acoustic transducer arrangement of claim 8, wherein the resonance frequency of the transmitter element is higher than 20 kHz.

10. The acoustic transducer arrangement of claim 1, wherein each of the transmitter elements is formed by an oscillating element characterized by a specific resonance frequency, a number of the multiple different frequency components being equal to the number of the transmitter elements in the array.

11. The acoustic transducer arrangement of claim 1, wherein said at least one electrically conductive membrane is accommodated in the paths of all the acoustic wave components generated by the transmitter elements.

12. The acoustic transducer arrangement of claim 1, wherein the control unit is configured to modulate the output data stream to be indicative of a network address of an associated communication station connectable to a communication network.

13. The acoustic transducer arrangement of claim 1, wherein the control unit is configured to frequency modulate the output acoustic signal in accordance with a predetermined sequence of frequencies.

14. The acoustic transducer arrangement of claim 13, wherein the frequency components generated by the transmitter elements are spaced from each other by a predetermined value.

15. The acoustic transducer arrangement of claim 14, wherein said frequency modulation is such that a presence in the multi-frequency acoustic signal of a specific one of frequency components of said predetermined sequence of frequencies is indicative of binary "1" and absence of a specific frequency component is indicative of binary "0".

16. The acoustic transducer arrangement of claim 1, wherein the control unit is configured to apply an amplitude modulation to the frequency components.

17. The acoustic transducer arrangement of claim 16, wherein the amplitude modulation utilizes at least one of the following: is based on that the amplitudes of the frequency components in the multi-frequency stream vary in a certain predefined order; is based on that each of the amplitudes of the frequency components generated by the transmitter elements is within a predefined range; is based on a specific key defining a certain sum of the amplitudes of specific bits in the data sample; and is based on a specific key defining a certain difference between the amplitudes of the adjacent frequency components in the multi-frequency stream.

18. A communication device connectable to a communication network, the device comprising an acoustic transducer arrangement comprising:

an acoustic transmitter assembly including an array of transmitter elements operable to generate together a multi-frequency acoustic signal, the acoustic transmitter assembly comprising at least one electrically conductive membrane accommodated in a path of an acoustic wave component generated by one or more of the transmitter elements and operating to oscillate with a frequency different from that of said acoustic wave component, a number of the multiple different frequency components forming the acoustic signal being thereby higher than the number of the transmitter elements in the array; and a control unit preprogrammed to operate the acoustic transmitter assembly in accordance with a digital data stream indicative of a received signal to generate the multi-frequency acoustic signal indicative of the received data stream.

19. A communication system comprising at least two communication devices connectable to each other through at least one acoustic transducer arrangement comprising:

an acoustic transmitter assembly including an array of transmitter elements operable to generate together a multi-frequency acoustic signal, the acoustic transmitter assembly comprising at least one electrically conductive membrane accommodated in a path of an acoustic wave component generated by one or more of the transmitter elements and operating to oscillate with a frequency different from that of said acoustic wave component, a number of the multiple different frequency components forming the acoustic signal being thereby higher than the number of the transmitter elements in the array; and a control unit preprogrammed to operate the acoustic transmitter assembly in accordance with a digital data stream indicative of a received signal to generate the multi-frequency acoustic signal indicative of the received data stream.

20. A method for use in data exchange between communication systems, the method comprising utilizing an acoustic transducer arrangement configured to carrying out the following:

receiving an electrical, RF or IR signal encoded with data coming from a first communication system and addressed to a second communication system;

converting the received signal into a corresponding digital data stream;

processing said digital data stream to translate said digital data stream into a predetermined sequence of frequencies, said processing comprising slicing said digital data stream into samples that are of a predefined fixed length and generating a corresponding sequence of voltages in accordance with the predefined order of frequencies of the transmitters in the array, said sequence of voltage being used for the operation of said array of the acoustic transmitters;

concurrently operating an array of acoustic transmitters to generate a multi-frequency acoustic signal in the form of a superposition of frequency components generated by the acoustic transmitters; and transmitting the generated multi-frequency acoustic signal to a second acoustic transducer arrangement associated with the second communication system.

21. The method of claim 20, comprising:

receiving an external multi-frequency acoustic signal encoded with certain data addressed to the first communication system; and processing the received acoustic signal in accordance with data indicative of a predetermined sequence of frequencies to thereby decode the data.

22. The method of claim 20, wherein the generated acoustic signal is transferred to the second communication system via a network formed by a plurality of the acoustic transducer arrangements communicatable with each other.

23. The method of claim 22, wherein the data is indicative of the network address of the respective acoustic transducer arrangement.

24. The method of claim 20, wherein each of said frequencies is higher than 20 kHz.

25. The method of claim 20, wherein said processing of the digital data stream includes frequency modulation of the acoustic signal to be transmitted, in accordance with a predetermined sequence of frequencies.

26. The method of claim 25, wherein the frequency components generated by the transmitter elements are spaced from each other by a predetermined value.

27. The method of claim 26, wherein said frequency modulation is such that a presence in the multi-frequency acoustic signal of a specific one of frequency components of said predetermined sequence of frequencies is indicative of binary "1" and absence of a specific frequency component is indicative of binary "0".

28. The method of claim 20, wherein said processing of the digital data stream comprises an amplitude modulation of the data stream.

29. The method of claim 28, wherein said amplitude modulation utilizes at least one of the following: comprises assigning to each of the frequencies a certain amplitude in accordance with predefined amplitude ranges for said frequencies; is based on that the amplitudes of the frequency components in the multi-frequency stream vary in a certain predefined order; is based on that each of the amplitudes of the frequency components generated by the transmitter elements is within a predefined range; is based on a specific key defining a certain sum of the amplitudes of specific bits in the data sample; and is based on a specific key defining a certain difference between the amplitudes of the adjacent frequency components in the multi-frequency stream.

30. The method of claim 20, wherein the decoding of the received acoustic signal includes an error correction, the error correction being based on one of the following: checking for the amplitudes order in the received acoustic signal; and checking for a certain threshold for an amplitude difference between the adjacent frequencies in the received frequency stream.

31. The method of claim 28, wherein the decoding of the received acoustic signal includes an error correction.

32. The method of claim 30, wherein the error correction utilizes a certain key in the form of a predetermined digital stream periodicity in the received acoustic signal.

\* \* \* \* \*